Feb. 3, 1942.    L. SAMELSON    2,272,042
FOOD SLICER
Filed June 4, 1940

INVENTOR
Lester Samelson
BY
ATTORNEYS

Patented Feb. 3, 1942

2,272,042

UNITED STATES PATENT OFFICE 2,272,042

FOOD SLICER

Lester Samelson, Bridgeport, Conn., assignor to Lorraine Metal Manufacturing Company, Bridgeport, Conn., a corporation of New York Application June 4, 1940, Serial No. 338,677

4 Claims. (Cl. 31—25)

The present invention relates to an improved food slicer of the type adapted to be used with soft foods.

It is an object of the invention to provide a food slicer having a food-supporting tray movable over the top surface of the base and upon which the food to be sliced can be placed and manipulated without further handling.

It is a further object of the invention to provide a device in which the food-supporting tray can be readily removed for cleaning.

According to the present invention, these objects are obtained by providing a base with a food-receiving tray slidable along the upper surface thereof and providing a fixed cutting member adapted to cooperate with the food carried by the tray to cut the same in desired slices.

The food tray of the present invention is made from thin metal and is provided with downwardly projecting flanges at the sides thereof which are engageable in slots in the upper surface of the base to form guides for the sliding food tray.

One end of the food tray is provided with an upstanding wall which forms an abutment for the food placed on the tray, and, at the same time, a means by which the tray can be moved into cutting position without the fingers contacting the food on the tray.

In the preferred form of the invention, the dependent walls are disposed at an angle to the plane of the tray, and cooperating with similarly positioned slots in the base to hold the tray against accidental removal therefrom. Means are also provided on the base for limiting accidental movement of the tray along the base.

Other features and advantages of the invention will be apparent from the specification and claims, when considered in connection with the drawing, in which:

Figure 1:
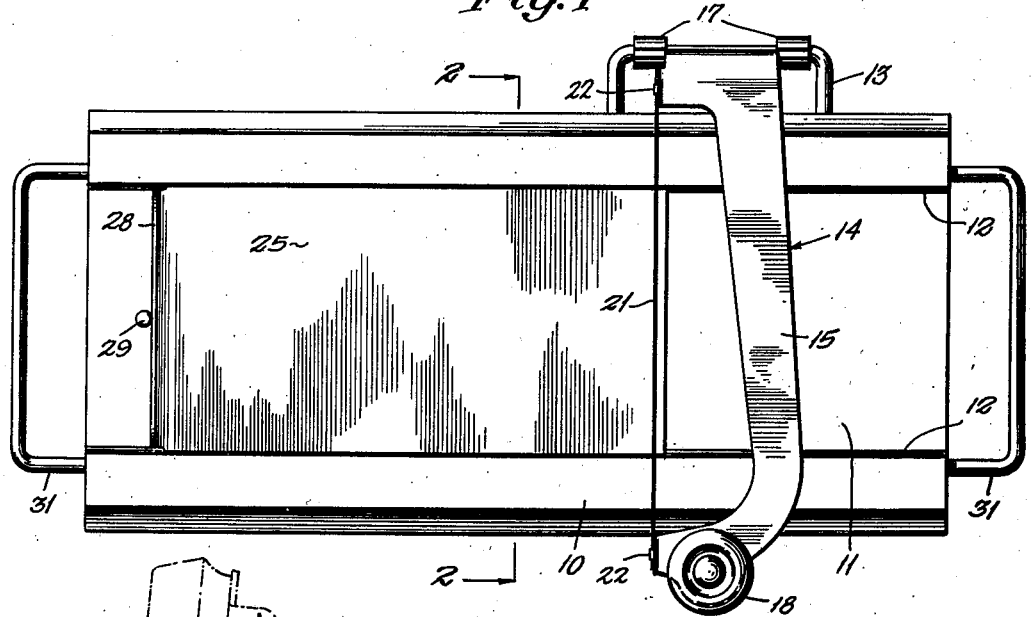
Figure 1 shows a top plan view of the device.

As shown in the drawing, the device of the present invention comprises an elongate base 10, preferably of wood, having a flat upper surface 11 provided with a pair of longitudinally extending grooves 12. Adjacent one end of the base a U-shaped rod 13 is secured in the side of the base in such a manner that the bow of the U projects outwardly therefrom and forms a support for a cutting implement 14.

While the cutting implement may take many forms, according to the present invention it comprises a substantially C-shaped arm 15 stamped from sheet metal. At one end of the arm a dependent portion 16 is bent around the rod-like member 13 to form a hinge 17 whereby the arm is pivotally mounted for movement transversely of the base from the position shown in dotted lines in Fig. 2 to that position shown in full lines therein.

The other end of the arm is provided with a handle or knob 18 by which the cutter member can be manipulated. Extending across the open end of the C-shaped arm, as shown in Fig. 1, and carried by ears 19, 20 dependent from the arm, is a cutting element 21. This cutting element is illustrated as being a wire having its ends attached to the ears in any suitable manner, as by spot welding or by having a loop 22 lanced from the dependent ears and bent outwardly to receive and clamp the wire between the loop and the ear to hold it in position.

I have found that it is preferable to use piano wire as the cutting element because of its high tensile strength. When this type of wire is used, I have been able to readily and satisfactorily slice cheese, butter, soft fruit and other foods of a like nature without undue stretching of the wire.

As will be noted, the C-shaped arm extends horizontally and lies substantially parallel with the base. This provides a space between the arm and the cutting element which enables a slice of the food product of substantial thickness to be cut without interference by the arm.

Figure 4:
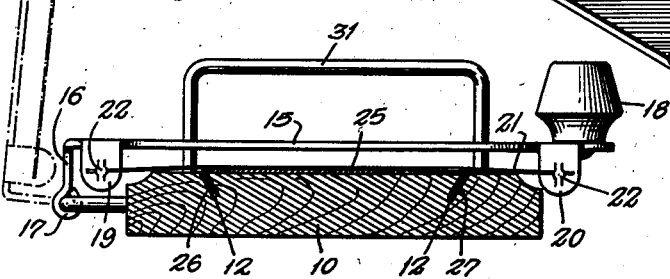
Fig. 4 shows a perspective view of the tray.

Inasmuch as the U-shaped rod 13 is substantially the same width as the base of the C-shaped arm pivotally mounted thereon, the arm will be held against movement longitudinally of the base. In order that the food can be readily moved into position to cooperate with this fixed cutting element, I have provided a novel food-supporting tray, as shown in Fig. 4, comprising a sheet metal plate 25 slidably disposed over the upper surface of the base and having at its longitudinal edges dependent flanges 26, 27. These flanges extend into the grooves 12 in the top of the base so as to form a guide for the tray as it slides therealong to bring the food into proper position for cutting.

Figure 2:
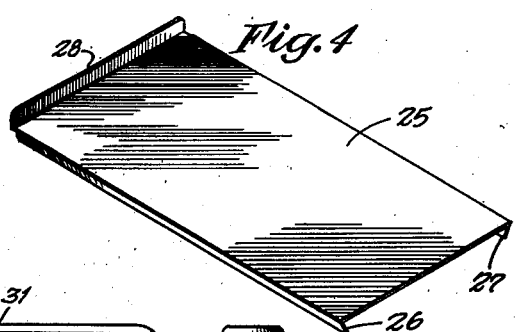
Fig. 2 is a transverse sectional view, taken along lines 2—2 of Fig. 1.

When the food has been moved to its proper position and arm 14 has been moved to the position shown in full lines in Fig. 2, the cutting element will have passed entirely through the food and into engagement with the tray and have completely severed a slice of the food of the desired thickness.

The tray being guided longitudinally of the base and the cutting element moving transversely of the base will insure even thickness of the slices.

While the dependent flanges may be positioned at right angles with respect to the base, in the preferred form of the invention the slots are cut at opposite acute angles to the surface of the base as shown in Fig. 2 and the flanges bent to conform with the angle of the slots and thus become interlocked therewith so as to retain the plate against upward movement from the surface of the base while still permitting the tray to be removed from the end of the base by sliding movement along the base.

Figure 3:
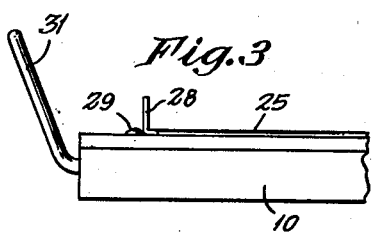
Fig. 3 shows a side elevation of one end of the device.

At the end of the tray, I have provided an upstanding wall 28, as shown in Fig. 3, against which the food to be cut may be placed and by which the tray can be pushed to move the food thereon into cutting position with respect to the cutting element so that the desired amount of food carried by the tray can be severed therefrom without contacting the food with the hands.

To prevent the tray from being unintentionally slid from the base, I have provided an abutment 29 adjacent one end of the base to hold the tray against movement from the base in that direction, while the cutting arm, which is normally disposed over the base, will operate as an abutment at the other end of the base to prevent the tray from being removed unintentionally from the other end of the base.

When it is desired to clean the tray, it is merely necessary to lift the cutting arm and slide the tray off the base at that end of the base.

The base may be provided with handles by which it can be carried about. In the preferred form of the invention, these handles comprise wire loops 31 secured to each end of the base and extending a substantial distance above the upper surface of the plate. The loops are of such a width that the food tray can be slipped therethrough when removing the same from the base. As is shown in Fig. 2, the upper surface of the handle is substantially in the plane of the knob on the cutting element so that it serves as a means for protecting the cutting element from undue pressure and during shipment and when stored.

If the food product on the tray is a relatively thin piece, which will pass through the handles as the tray is removed, the same can be stored in a refrigerator or other storage means without removing it from the tray. In this connection, it may be desirable to make the handles extend to a sufficient height to permit a small cake of butter or cheese to be removed with the tray.

Variations and modifications may be made within the scope of this invention and portions of the improvements may be used without others.

I claim:

1. In a food slicer, a base having longitudinally extending grooves in the upper surface thereof and forming opposite acute angles with respect to the surface of the base; a sheet metal food tray slidable on the upper surface of the base, said tray having means dependent therefrom and located in said angularly disposed grooves for interlocking said tray to said base and for guiding said tray during sliding movement to bring food carried thereby to a cutting station; and means at this cutting station for slicing the food carried by the tray.

2. In a food slicer, a base having longitudinally extending grooves in the upper surface angularly disposed with respect to said surface of the base; a sheet metal food tray slidable on the upper surface of the base, said tray having the side edges bent down to form dependent flanges located in said angularly disposed grooves for interlocking said tray to said base and for guiding said tray during sliding movement to bring food carried thereby to a cutting station; and means at the cutting station for slicing the food carried by the tray.

3. In a food slicer, a base having a longitudinally extending groove in the upper surface thereof disposed at an angle to the surface of the base; a sheet metal food tray slidable on the upper surface of the base, said tray having a dependent flange located in said angularly disposed groove for interlocking said tray to said base and for guiding said tray during sliding movement to bring food carried thereby to a cutting station; and means at this cutting station for slicing the food carried by the tray, said tray being removable from the base for cleaning by sliding the same from the end of the base.

4. In a food slicer, an elongate base having a plurality of longitudinally extending grooves in the upper surface thereof disposed at an acute angle to the surface of the base; a sheet metal food tray slidable on the upper surface of the base, said tray having dependent flanges located in said angularly disposed grooves for interlocking said tray to said base and for guiding said tray during sliding movement to bring food carried thereby to a cutting station; means at this cutting station for slicing the food carried by the tray, said tray being separable from said base by sliding the same out of the grooves at the end of the base; and handles located at the ends of the base and so positioned as to enable the tray to be slid from the end of the base.

LESTER SAMELSON.